April 3, 1951 H. E. ANTHONY 2,547,146
HOLLOW PONTOON STRUCTURE AND METHOD OF MAKING THE SAME
Filed Jan. 30, 1947 2 Sheets-Sheet 1
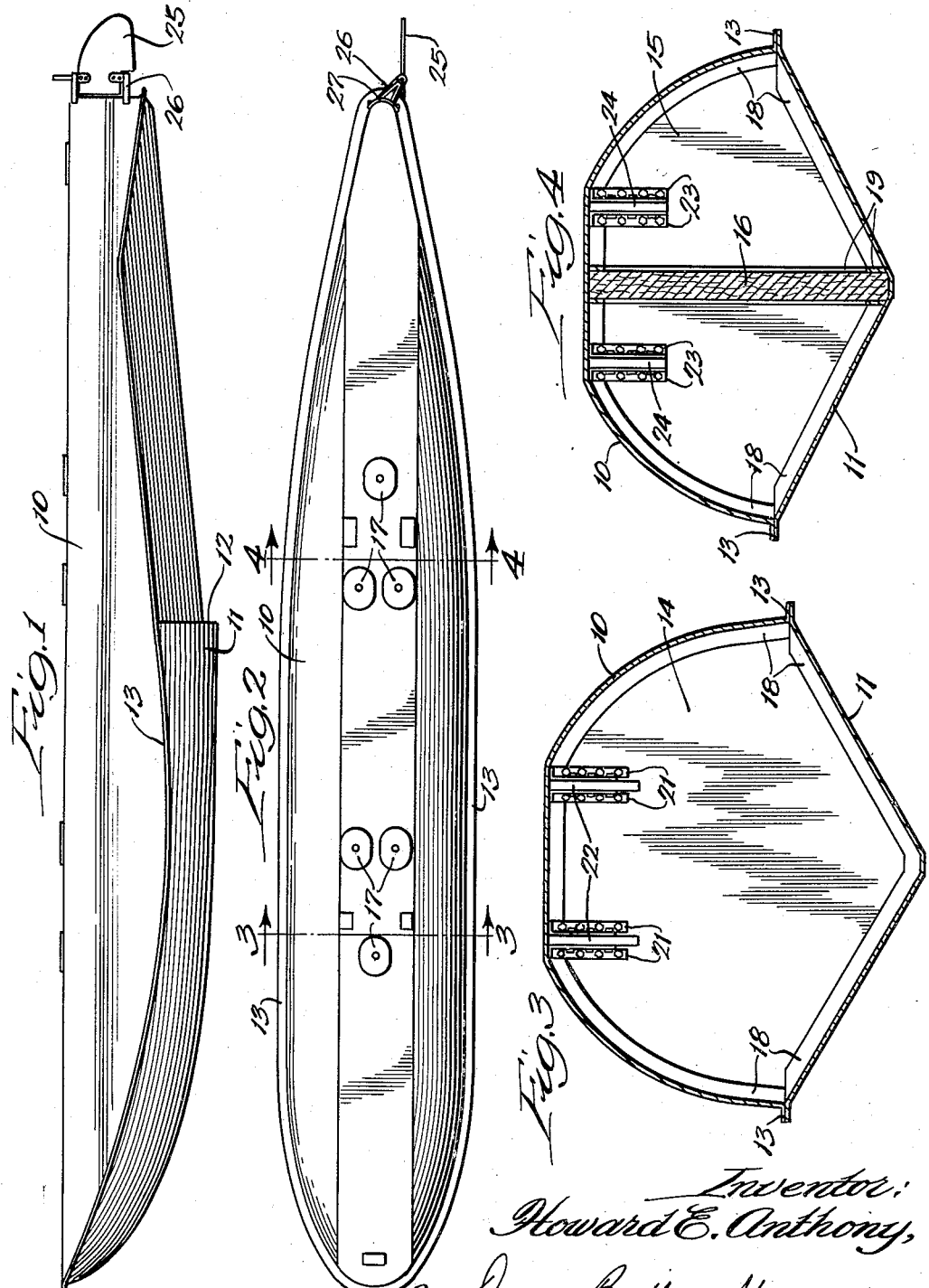
Inventor:
Howard E. Anthony,
By Dawson, Bottley Spangenberg,
Attorneys.

April 3, 1951          H. E. ANTHONY          2,547,146
HOLLOW PONTOON STRUCTURE AND METHOD OF MAKING THE SAME
Filed Jan. 30, 1947          2 Sheets—Sheet 2
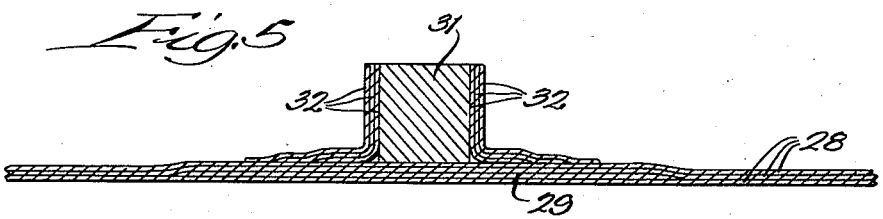
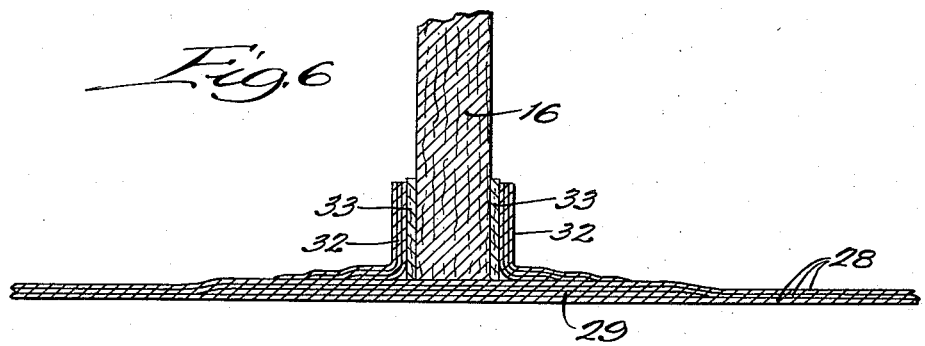
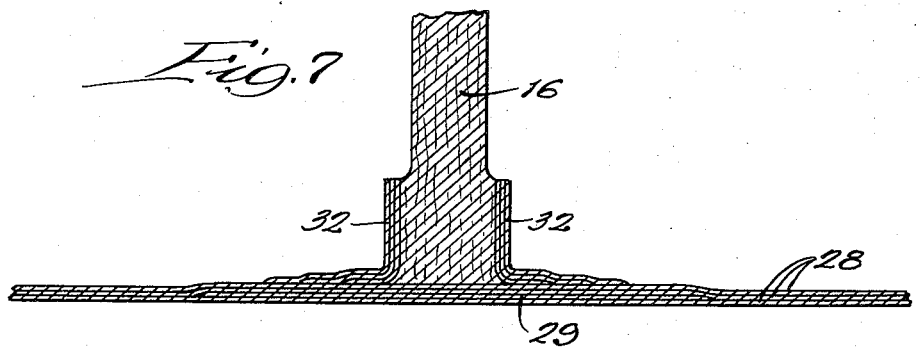
Inventor:
Howard E. Anthony,
By Dawson, Booth and Spangenberg
Attorneys.

Patented Apr. 3, 1951

2,547,146

UNITED STATES PATENT OFFICE 2,547,146

HOLLOW PONTOON STRUCTURE AND METHOD OF MAKING THE SAME

Howard E. Anthony, Benton Harbor, Mich.

Application January 30, 1947, Serial No. 725,393

8 Claims. (Cl. 9—6)

This invention relates to hollow structures and method of making the same and more particularly to the manufacture of relatively light weight hollow devices such as aircraft pontoons and the like from fibrous material impregnated with plastic.

It is one of the objects of the invention to provide a hollow structure and method of making the same which is formed by a plurality of sheets of fibrous material reinforced and integrally bonded together by plastic.

Another object is to provide a hollow structure and method of making the same in which reinforcing strips or sheets are integrally bonded to an outer skin sheet by plastic material. If desired, the reinforcing sheets may serve additionally as bulkheads or separators to divide the structure into separate compartments.

Still another object is to provide a hollow structure and method of making the same in which precured sheets of fibrous material impregnated with plastic are integrally connected by assembling them with uncured plastic between their meeting or overlapping edges and recuring the assembly. Preferably strips of fibrous material impregnated with plastic are laid between the meeting or overlapping edges of the sheets to hold the uncured plastic in place and to insure proper bonding during subsequent curing operations.

A further object is to provide a hollow structure and method of making the same in which sheets of fibrous material impregnated with plastic are reinforced by laying strips of similar impregnated material thereon and holding the edges of such strips at an angle to the sheets during curing to form integral flanges.

The above and other objects and advantages of the invention will be more readily apparent from the following description when read in connection with the accompanying drawings, in which—

Figure 1 is a side elevation of a pontoon constructed according to the invention;

Figure 2 is a top plan view of the pontoon;

Figures 3 and 4 are transverse sections on the lines 3—3 and 4—4 respectively of Figure 2; and Figures 5, 6 and 7 are partial sectional views illustrating successive steps in the manufacture of the pontoon.

The pontoon, as illustrated in Figures 1 to 4 is adapted for use on aircraft and is particularly suitable for use on relatively small aircraft although it is not limited thereto. As shown, the pontoon comprises an elongated hollow body formed by an upper concave section 10 and a lower concave section 11 divided into a forward part and a rear part by a step 12. The two sections may be shaped to form a pontoon of any desired configuration and are joined at a longitudinally extending joint 13 which may be formed by outwardly extending flanges at the edges of the sections which overlie each other when the sections are laid together. The entire outer skin of the pontoon is formed by sheets of fibrous material such as fiber glass impregnated with a plastic such as vinyl resin according to the method to be described later.

On its interior the pontoon is preferably divided into a plurality of separate water tight compartments and is further reinforced by a pair of transverse bulkheads 14 and 15 and by a longitudinally extending divider or bulkhead 16 which extends through the central part of the pontoon between the bulkheads 14 and 15. This arrangement of bulkheads divides the interior of the pontoon into four separate water tight compartments to which access may be had through openings closed by inspection covers 17 in the top of the pontoon. The bulkheads are secured to the outer skin covering by means of flanges or channels 18 formed on the interior surface of the skin covering and between which the bulkhead sheets are secured. The central longitudinal bulkhead may be secured in place by similar flanges or channels 19 on the top and bottom pontoon sections and also on the facing surfaces of the bulkheads 14 and 15.

For mounting the pontoon mounting brackets which may be of metal are secured at spaced points to the bulkheads and the upper surface of the pontoon skin to receive mounting fastenings carried by the aircraft. As shown, the bulkhead 14 carries two sets of mounting brackets 21 which are fastened to the forward surface of the bulkhead 14 by bolts or the like and which are further secured to flanges or fins 22 formed on the bulkhead to strengthen the mounting brackets. The mounting brackets closely underlie the upper surface of the pontoon top section to receive supporting fittings which may be bolted or otherwise secured thereto. Preferably packings or gaskets lie between the fittings and the upper pontoon surface to prevent leakage. Similar fittings, as shown at 23, are secured to the forward surface of the bulkhead 15 and to flanges or fins 24 thereon.

The pontoon may also carry a rudder, as shown at 25, which is pivotally mounted on a supporting bracket 26 secured to the rear end of the pontoon by bolting or the like. Preferably the bracket 26 includes a plate as shown at 27 which overlies the rear curved end of the pontoon and which may be secured thereto by bolting with sealing material between the bracket and the pontoon to eliminate leakage.

The entire pontoon assembly with the exception of the mounting brackets and rudder brackets is formed of fibrous material such as glass fibers impregnated and bonded together with a curable plastic such as vinyl resin. According to the present invention the entire pontoon structure is integrally bonded by the plastic material to form an integral unitary assembly having no mechanically connected parts which might be subject to leakage or to fracture. While various types of fibrous material can be employed, I prefer to use sheets of glass felt which may, if desired, be covered on their outer surfaces by woven glass sheets to improve the external finish and to increase the strength. In forming products of this type the fibrous sheets are preferably first laid up in a form being cut or torn where necessary to fit the form. The sheets are then impregnated with a plastic material such as vinyl resin in liquid condition and may be covered with a flexible cover sheet and evacuated to remove all of the air. With the impregnated sheets in the form in an evacuated condition and with the plastic material uniformly dispersed therethrough, heat is applied as by placing the assembly in a furnace to raise the temperature to approximately 200° F. to 300° F. to cure the vinyl resin. After the curing operation the cover sheet may be removed and the impregnated sheet will be found to be in a relatively rigid dry condition and to possess an extremely high degree of tensile strength and resistance to impact.

In forming the pontoon as shown in Figures 1 to 4, the upper and lower sections are separately formed and cured in the manner described and are thereafter assembled with the bulkheads in place and are recured to complete the pontoon. I have found that once the material has been cured it may be reheated a number of times without damage so that the recuring operation does not affect the original strength or resistance to impact of the skin sheets. During the initial curing operation, the flanges or channels 18 and 19 are integrally bonded to the skin sheets. For this purpose a plurality of skin sheets formed of woven or felted fibers as indicated at 28 in Figures 5 to 7 may be placed in the mold. At points where it is desired to reinforce the skin, additional short sheets or strips as shown at 29 may be placed over or between them to produce a section of increased thickness. Thereafter a block 31 which is preferably of polished metal and to which the plastic will not adhere is laid on the sheet at the point where it is desired to form a flange or channel. Short strips or sheets of fibrous material 32 are then laid along the opposite sides of the blocks 31 with their edges against the sides of the blocks and with their opposite edges overlying the adjacent parts of the sheets 28. The entire assembly may then be impregnated with a plastic such as vinyl resin to fill the sheets 28, 29 and 32 and may be cured as described above. After curing the blocks 31 may be removed since the plastic does not adhere to them to leave the sheets with projecting flanges or channels thereon. These flanges or channels alone serve a valuable reinforcing function and may be employed where desired for this purpose. According to the present invention they serve additionally to fasten the bulkheads in place.

With both of the sections completed and cured with the flanges or channels in place thereon, the two sections may be assembled together with the flanges 13 overlying each other as seen in Figures 3 and 4. In the assembly the bulkhead sheets which are also formed of fibrous material impregnated with the same plastic may be placed with their edges lying in the respective channels. Preferably the bulkhead sheets have been preformed and precured in the same manner as that described above with the flanges 24 thereon, and the mounting brackets 21 and 23 may be bolted thereto before final assembly of the bulkheads in the pontoon.

When the parts are assembled together strips of fibrous material impregnated with the same plastic such as vinyl resin are laid between the surfaces which are to be connected. Such strips are illustrated at 33 in Figure 6 lying between the flange material 32 and the center bulkhead 16, and it will be understood that similar impregnated strips are placed between the overlapping flanges 13 and between the other bulkhead sheets and the sides of their respective channels. When the assembly is again heated to a curing temperature of between 200° F. and 300° F., the uncured plastic carried by the strips 33 will integrally bond to the adjacent plastic impregnated sheets to form in effect an integral assembly, as shown in Figure 7. I have found that the connection between the adjacent sheets according to this method is of substantially the same strength as the sheets themselves so that the entire assembly becomes one integral homogeneous unit.

While the invention has been particularly described in connection with pontoons, it will be apparent that it could be applied equally well to various other types of devices such as boats and parts of aircraft such as wing or fuselage sections or to containers such as fuel tanks and the like. It is, therefore, not intended that the scope of the invention should be limited to the illustrative hollow structure and method described in detail herein nor otherwise than by the terms of the appended claims.

What is claimed is:

1. The method of making hollow structures which comprises molding a plurality of plastic impregnated fibrous sheets in which the plastic material is converted substantially to the full extent of polymeric growth into forms such that when fitted together they will form a completed hollow structure, assembling the sheets together with strips of fibrous material impregnated with uncured plastic between their meeting edges, and subjecting the entire assembly to heat and pressure whereby the uncured plastic material is carried through a plastic stage to secure the sheets together in the assembly.

2. The method of making hollow structures which comprises forming a plurality of fibrous sheets impregnated with uncured plastic so that when fitted together they will form a completed hollow structure, placing on the sheets strips of fibrous material impregnated with uncured plastic which are turned away from the sheets at one edge to form flanges on the interior of the hollow structure, treating the sheets and strips to cure the plastic and to secure the sheets to the strips, assembling the cured sheets together with uncured plastic between their meeting edges, placing reinforcing sheets on the interior of the hollow structure with their edge portions engaging the flanges and with uncured plastic between the flanges and the reinforcing sheets, and treating the assembly to cure the uncured plastic thereby to secure the sheets together at their meeting edges and to secure the reinforcing sheets to the flanges.

3. The method of making hollow structures which comprises forming a plurality of fibrous sheets impregnated with uncured plastic so that when fitted together they will form a complete hollow structure, placing on the sheets parallel pairs of strips of fibrous material impregnated with uncured plastic, placing between the strips of each pair blocks of material to which the plastic will not adhere and turning the edges of the strips outward from the sheets to lie against the sides of the blocks and to form channels, treating the sheets and strips with the blocks in place to cure the plastic and to secure the strips to the sheets, removing the blocks, assembling the sheets to form a hollow structure with the channels on its interior, placing reinforcing sheets on the interior of the structure with their edges fitting in the channels, placing uncured plastic between the meeting edges of the sheets and between the sides of the channels and the reinforcing sheets, and treating the assembly to cure the uncured plastic and to secure the sheets together and the reinforcing sheets to the channels.

4. The method of making pontoons which comprises forming a pair of fibrous sheets impregnated with uncured plastic so that they will fit together to form a pontoon, placing strips of fibrous material impregnated with uncured plastic on the sheets with their edges projecting therefrom to form internal channels in the pontoon, treating the sheets and strips to cure the plastic and to secure the strips to the sheets, assembling the sheets with a thin film of uncured plastic between their meeting edges, placing reinforcing and dividing sheets in the assembly with their edges fitting in the channels and with a thin film of uncured plastic between the reinforcing sheets and the channels to reinforce the pontoon and to separate its interior into a plurality of compartments, and treating the assembly to cure the uncured plastic and to secure the parts together.

5. The method of forming a hollow structure which comprises impregnating a plurality of sheets of fibrous material with vinyl resin, heating the sheets to cure the vinyl resin, placing the sheets together with edge portions thereof overlapping, placing between the overlapping edge portions strips of fibrous material impregnated with vinyl resin, and reheating the sheets to cure the last mentioned vinyl resin thereby integrally to bond the edge portions of the sheets together.

6. A hollow structure comprising plastic sheets reinforced with fibrous material shaped to fit together at their edges and to have internally extending flanges thereon, and preshaped reinforcing elements formed of substantially the same materials as the plastic sheets fitting against the flanges, the juxtaposed edges of the sheets being secured together and the juxtaposed surfaces of the reinforcing elements and flanges being secured together by a thin layer of plastic cured in place.

7. A hollow structure comprising sheets of fibrous material impregnated with plastic and shaped to fit together at their edges, each of the sheets having spaced flanges forming channels extending toward the interior of the structure, and internal reinforcing sheets in the structure with their edges lying in the channels, the edges of the sheets being secured together and the reinforcing sheets being secured in the channels by a thin layer of plastic cured in place.

8. A pontoon comprising upper and lower elongated sections shaped to fit together at their edges to form a complete hollow pontoon and each formed of fibrous material impregnated with plastic, internally extending channels secured to the inner surfaces of the sections and formed by strips of fibrous material impregnated with plastic, and internal bulkheads in the pontoon with their edge portions lying in the channels, the edges of the sheets being secured together and the bulkheads being secured in the channels by plastic cured in place.

HOWARD E. ANTHONY.

REFERENCES CITED

The following references are of record in the file of this patent:

UNITED STATES PATENTS

| Number | Name | Date |
|---|---|---|
| 250,717 | Durant | Dec. 13, 1881 |
| 1,344,634 | Haskell | June 29, 1920 |
| 1,565,532 | Tupper | Dec. 15, 1925 |
| 1,693,773 | Anderson | Dec. 4, 1928 |
| 1,789,642 | Wirth | Jan. 20, 1931 |
| 2,342,023 | Vidal et al. | Feb. 15, 1944 |
| 2,392,734 | Haberstump | Jan. 8, 1946 |
| 2,406,697 | Lincoln | Aug. 27, 1946 |
| 2,417,586 | Crosley | Mar. 18, 1947 |